(12) United States Patent
Matsumoto et al.

(10) Patent No.: US 7,599,853 B2
(45) Date of Patent: Oct. 6, 2009

(54) SYSTEM AND METHOD OF ARRANGING DELIVERY OF ADVERTISEMENTS OVER A NETWORK SUCH AS THE INTERNET

(75) Inventors: Takuya Matsumoto, Toyonaka (JP); Shiro Kidera, Ebina (JP); Ryuichi Ishii, Yokohama (JP)

(73) Assignee: Criteria Communications Inc., Tokyo (JP)

( * ) Notice: Subject to any disclaimer, the term of this patent is extended or adjusted under 35 U.S.C. 154(b) by 762 days.

(21) Appl. No.: 10/718,660

(22) Filed: Nov. 24, 2003

(65) Prior Publication Data

US 2004/0111319 A1    Jun. 10, 2004

Related U.S. Application Data

(63) Continuation of application No. 09/457,591, filed on Dec. 9, 1999, now Pat. No. 6,763,334.

(51) Int. Cl.
  *G06Q 30/00* (2006.01)
(52) U.S. Cl. ........................................ 705/14
(58) Field of Classification Search .................... 705/14
  See application file for complete search history.

(56) References Cited

U.S. PATENT DOCUMENTS

| 5,724,521 | A |   | 3/1998  | Dedrick |
|-----------|---|---|---------|---------|
| 5,791,991 | A |   | 8/1998  | Small   |
| 5,809,242 | A |   | 9/1998  | Shaw et al. |
| 5,848,396 | A | * | 12/1998 | Gerace ......................... 705/10 |
| 5,937,390 | A |   | 8/1999  | Hyodo |
| 5,949,419 | A | * | 9/1999  | Domine et al. ............... 715/744 |
| 5,991,740 | A |   | 11/1999 | Messer |
| 6,763,334 | B1| * | 7/2004  | Matsumoto et al. ........... 705/14 |

FOREIGN PATENT DOCUMENTS

| JP | 10-254829  | 9/1998 |
| JP | 11-154159  | 6/1999 |
| WO | WO 98/34189 | 8/1998 |

OTHER PUBLICATIONS

Machlis, Sharon, "Measuring web site traffic", Computerworld, Jun. 17, 2002; 36, 25, p. 42.*

* cited by examiner

*Primary Examiner*—Donald L Champagne
(74) *Attorney, Agent, or Firm*—Cheng Law Group, PLLC (57) ABSTRACT

A method and system of arranging advertisements on a network for a potential media owner or affiliate to sell ad space on a network media to an advertiser. The advertiser's conditions and the affiliate's acceptance are made on the network through an agent's server. The server provides an invitation page for entry of the advertiser's conditions. The conditions are disclosed to the affiliate on the network. When the affiliate accepts the conditions on the network, the agent's server responds to make an advertisement contract, and allocates an advertiser's web site to the ad space of the network media. The number of the responses made to the advertisement is counted at the agent's server, which delivers statistical data of the counted responses on the network to the advertiser and the affiliate for determination of the payment and for evaluation of the effectiveness of the advertisement.

15 Claims, 9 Drawing Sheets

Advertiser's Request (Invitation Page)

- 20
- Name of Advertiser ▭ — 21
- Campaing Objective ▭ — 22
- Campaing Period from ▭ to ▭ — 23

| Selection of responses | Cost per response |
|---|---|
| ☐ Visiting Web site | ▭ |
| ☐ Downloading software | ▭ |
| ☐ Applying for prize | ▭ |
| ☐ Answering questionanaire | ▭ |
| ☐ Requesting catalog | ▭ |
| ☐ Requesting subcription to newsletter | ▭ |
| ☐ Signing up for membershp | ▭ |
| ☐ Ordering a product or service | ▭ |
| ☐ ▭ | ▭ |

24, 25, 26

Maximum respnses per month ▭ — 27
Catogory of targent group ▭ — 28

29

Designation of affiliates ☐ ALL
☐ XXX ☐ YYY ☐ ZZZ
☐ QQQ ☐ SSS ☐ TTT

30

Copy and Layout of advertisement

31 ▭

32 URL of web site to be linked ▭

FIG. 4

List of intended Advertisements <Offer Page>    — 41

To: XXX

| | Advertiser's name | Campaign Objectives | Cost per response (Yen) | Expected Sales (Yen) |
|---|---|---|---|---|
| 1 | ABC | distribution of new catalogue | 100 | 500,000 |
| 2 | ABC | new membership promotion | 120 | 600,000 |
| 3 | DEF | trend survey | 150 | 800,000 |
| 4 | HIJ | new product sales promotion | 200 | 1,200,000 |
| 5 | HIJ | new membership promotion | 100 | 700,000 |
| 6 | LMN | new membership promotion | 1000 | 2,500,000 |
| 7 | LMN | new produt sales promotion | 1500 | 3,300,000 |

Enter number for details  ☐ — 42

FIG. 5

Detailed Information

Advertiser's Request (Invitation Page)

Name of Advertiser
Campaing Objective
Campaing Period   from       to

Selection of responses                Cost per response
☐ Visiting Web site
☐ Downloading software
☐ Applying for prize
☐ Answering questionanaire
☐ Requesting catalog
☐ Requesting subcription to newsletter
☐ Signing up for membershp
☐ Ordering a product or service
☐

Maximum respnses per month
Catogory of targent group

Designation of affiliates   ☐ ALL
☐ XXX    ☐ YYY    ☐ ZZZ
☐ QQQ    ☐ SSS    ☐ TTT Copy and Layout of advertisement URL of web site to be linked

Agreement for sales

Date:   yyyy/mm/dd

Ad space type

Affiliate code

FIG. 6

```
                    Administer Page

To(Advertiser ): ABC

Campaign Objective:  distribution of new catalogue

Campaign Code:  ABCXYZ
```

Period:

☐ Whole

☐ Specify   from: [         ]   to: [         ]

Download of log files:

☐ entrance page <page access number>

☐ action page  <action acess number>

☐ action proces  <result number>

[Download]

View Statistic:

☐ sort on APID

☐ sort on referring page

[View]

(labels: 80, 81, 82, 83, 84, 85)

FIG. 7

Statistical Report <FORM 1A>

To(Advertiser ): ABC

Campaign Objective: distribution of new catalogue

Campaign Code: ABCXYZ

Period: from 1999.11.10 to 1999.12.15

Download

| Date | Page Access number | Action Acess number | | Result number | |
|---|---|---|---|---|---|
| Total | 18692 | 11684 | 61.61% | 4719 | 24.88% |
| 11/10 | 1000 | 700 | 70.00% | 300 | 30.00% |
| 11/11 | 1200 | 800 | 66.66% | 450 | 37.50% |
| 11/12 | 1100 | 700 | 63.63% | 400 | 36.36% |
| 11/13 | 2000 | 1000 | 50.00% | 800 | 40.00% |
| 11/14 | 1500 | 850 | 56.67% | 630 | 42.00% |
|  |  |  |  |  |  |
|  |  |  |  |  |  |
|  |  |  |  |  |  |
|  |  |  |  |  |  |
|  |  |  |  |  |  |

Next ⇨ Top

FIG. 8

| | Administer Page |
|---|---|
| 90 | To(Affiliate ):XXX |
| 91 | Period:<br>☐ Whole<br>☐ Specify  from: [       ]  to: [       ] |
| 92 | Download of log files:<br>☐ entrance page <page access number><br>☐ action page  <action acess number><br>☐ action proces  <result number><br>                                           [Download] 93 |
| 94 | View Statistic:<br>☐ sort on Advertisers<br>☐ sort on APID<br>                                           [View] 95 |

SYSTEM AND METHOD OF ARRANGING DELIVERY OF ADVERTISEMENTS OVER A NETWORK SUCH AS THE INTERNET

This is a continuation application of Ser. No. 09/457,591, filed on Dec. 9, 1999, now U.S. Pat. No. 6,763,334.

BACKGROUND OF THE INVENTION

1. Field of the Invention

The present invention is directed to a system and method of arranging delivery of advertisements over a network such as the Internet.

2. Background Art

There have been proposed prior systems and methods of arranging the advertisement over the Internet between advertisers and media owners. The methods offer to the advertisers to buy ad space of the media owners on a pay-per-click or a pay-per-action basis. The Internet advertisement carries a vast number of different campaigns that attract prospective Internet users in different ways or expect different user's action. So, the advertisers and the media owners are looking for the measure for effectiveness of the campaign over the Internet which is not simply relying upon the cost-per-click or cost-per-action. In view of the above potential demands of the advertisers, the inventors have sought to provide a consistent scheme which enables an agent to arrange the advertisement between the advertisers and the media owners with optimized conditions beneficial to the both parties.

SUMMARY OF THE INVENTION

The present invention has been accomplished to present a unique method and system which is capable of arranging the advertisement in such a manner as to satisfy varying requirements of the advertisers for effective return from the advertisements, which is therefore a primary object of the present invention. The system in accordance with the present invention includes an agent's server provided with an invitation module, an offer module, and an arrangement module.

The invitation module is programmed to provide an invitation page on the network for inviting potential advertisers having an advertiser's own web site to place an intended advertisement on the network media. The invitation page includes a condition form for entry of specific conditions that the advertiser requests for the proposed advertisement. The condition form has a selection box listing defined responses expected to be made by a prospective user as a consequence of the advertisement so that the advertiser can select at the selection box one or more of the responses to be included in the conditions. Also, the condition form has a cost per response entry to be entered by the advertiser as indicating a unit cost payable for each response selected.

The offer module is programmed to, based on a reply from the advertisers, makes an ad schedule listing the intended advertisements with the specific conditions. The offer module provides an offer page which discloses the ad schedule over the network to a potential media owner or affiliate having a network medium so that the affiliate can determine whether or not to place the advertisement on an ad space of the network media in agreement on the specific conditions prescribed in the ad schedule. The offer page includes an agreement entry which instructs the affiliate to enter an acceptance for selling the ad space for the advertisement.

The arrangement module is programmed to make an advertisement contract between the advertiser and the affiliate upon receipt of the acceptance only from the affiliate, and allocates the advertiser's web site to the ad space of the network media placing the advertisement thereon.

The agent's server includes a response measurement module which is programmed to count the number of specific responses made at the advertiser's web site through the ad space. Further, included in the server is an administration module which is programmed to provide a statistical report over the Internet for furnishing the advertiser with an analysis of the responses being counted so that the advertiser can estimate the effectiveness of the advertisement.

Accordingly, it is possible with this system to select an optimum response expected by the user which is effective for the advertisement and beneficial to the affiliate. In addition, any suitable combination of the responses can be selected for consistent with varying interests of the advertisers.

The specifically defined responses includes visiting the advertiser's web site; downloading a file or software from the advertiser's web site; applying for a prize offered by the advertiser on the advertiser's web site; answering to a questionnaire from the advertiser on the web site; requesting a catalogue from the advertiser through the advertiser's web site; requesting subscription to a newsletter; signing up a membership of a club managed on the advertiser's web site; and ordering a product or service on the advertiser's web site.

The system is specifically adapted for the advertiser's web site which includes an entrance page destined from the ad space for guiding the user first, an action page designated in the entrance page and requiring entry of information or reply by the user before requesting a result of the specified response, and an action process module which responds to the specific response for processing the same. In association with these pages and module, the measurement module is configured to have an index CGI, an action CGI, and a result CGI. The arrangement module prepares an index URL, an action URL, and a result URL upon establishment of the advertisement contract in order to make a definite interrelation of the pages and the module of the advertiser's web site with the agent's server for collecting data and counts of the specific responses for each of the advertisements.

The index URL, which identifies a URL of the index CGI and includes an ad code assigned to the advertisement, is embedded in the ad space for linking the ad space to the index CGI. The action URL identifies a URL of the action CGI and is embedded in the entrance page for linking the entrance page to the action CGI. The result URL identifies a URL of the result CGI and is embedded in the action page for linking the action page to the action CGI.

The index CGI is also linked to an index log file which stores index data with regard to the user requesting access to the entrance page. The index data include:

1) date and time of the user requesting for access to the entrance page;
2) a referrer log showing data of at least the ad space from which the user makes the request for access to the entrance page of the advertiser's web site; and
3) the ad code.

The arrangement module also functions to locate an entrance page URL of the entrance page based upon the ad cod received at the index CGI by reference to a database table storing various ad codes in relation to various entrance page URLs. The arrangement module passes the located entrance page URL to the index CGI which responds to redirect the user's request made at the ad space to the entrance page immediately after storing the index data in the index log file.

The action CGI is also linked to an action log file which stores action access data with regard to the user requesting for access to the action page. The action access data includes:

1) date and time of the user requesting for access to the action page; and
2) a referrer log showing data of at least the ad space from which the user is led to the action page.

The arrangement module functions to locate an action page URL of the action page by collation of the data of the ad space received at the index CGI with data of the ad space received at the action CGI and by reference to the table storing the various ad codes in relation to various action page URLs. The arrangement module then passes thus located action page URL to the action CGI which responds to redirect the user's request at the entrance page to the action page immediately after storing the action access data in the action log file.

The result CGI is also linked to a result log file which stores action process data with regard to the user requesting the processing at the action process module. The action process data include:
1) date and time of the user requesting an access to the action process module; and
2) a referrer log showing data of at least the ad space from which the user is led to the action process module.

The arrangement module locates an action process URL of the action page by collation of the data of the ad space received at the index CGI with data of the ad space received at the result CGI and by reference to the table storing the various ad codes in relation to various action process URLs. Then, the arrangement module passes thus located particular action process URL to the result CGI which responds to redirect the user's request at the action page to the action process module immediately after storing the action process data in the result log file.

Thus, it is readily possible to correlate the particular advertisement to the entrance page, the action page and the action process page of the associated advertiser's web sites for obtaining statistical data for each advertisement with regard to the number of the accesses to the entrance page, the number of the access to the action page, and the number of requesting for the action process.

The present invention also provides a unique method comprising the following steps of:

providing an invitation page over the network for inviting potential advertisers each having an advertiser's web site to place an advertisement on the network with a condition form to specify conditions for the advertisement, the condition form having a list of defined responses expected to be made by a prospective network user in reply to the advertisement so that the advertiser can select at least one of the responses to be included in the conditions, the condition form having a cost per response entry to be filled by the advertiser as indicating a unit cost payable for the response selected, and having a media entry for designating a desired network media on which the advertisement is intended to be placed on;

receiving a reply to the invitation page from the advertiser and making therefrom an ad schedule with specific conditions for the advertisement;

providing an offer page which discloses the ad schedule on the network to a potential affiliate administering a network medium so that the affiliate can determine to place the advertisement on an ad space of the network media in agreement on the specific conditions mentioned in the ad schedule, the offer page including an agreement entry which instructs the affiliate to enter an acceptance for selling the ad space to the advertiser;

establishing an advertisement contract between the advertiser and the affiliate immediately upon receipt of the acceptance and delivering a confirmation of the contract to the advertiser and the affiliate;

allocating the advertiser's web site to the ad space in the network media placing the advertisement in order to count the number of the responses made through the ad space to the advertiser's web site during a predetermined period of time; and delivering data of the responses counted over the network for access by the advertiser as well as by the affiliate so that the advertiser can evaluate the effect of the advertisement and that the affiliate can charge the advertiser for the advertisement based upon the data.

Thus, the matching of the advertiser with the affiliate can be easy to accomplished on the network, and the advertisement contract can be made simply at the discretion of the affiliate for prompting the advertisement.

These and still other objects and advantageous features of the present invention will become more apparent from the following description of the preferred embodiment when taken in conjunction with the attached drawings.

DETAILED DESCRIPTION OF THE EMBODIMENT

Figure 1:
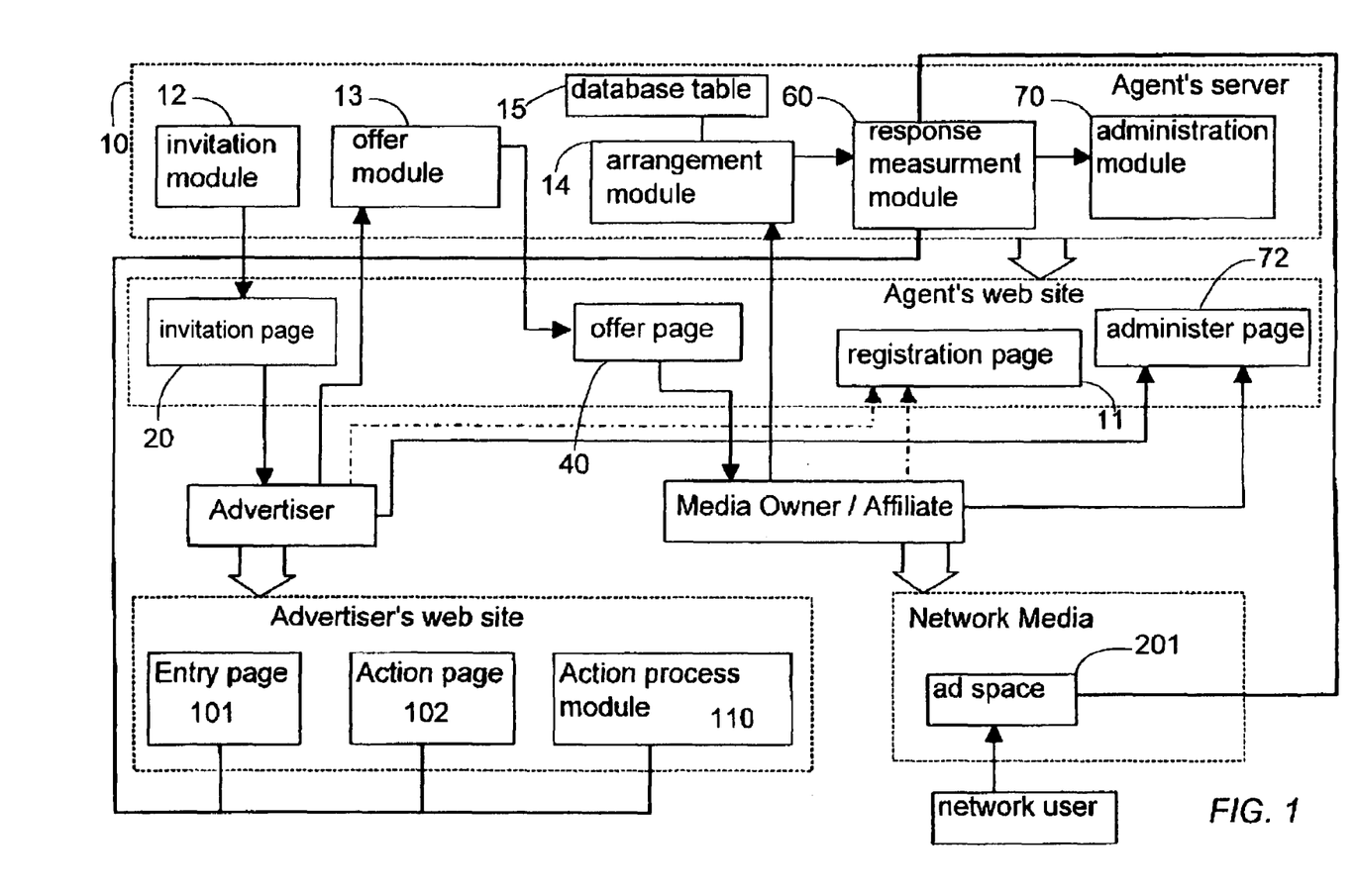
FIG. 1 is a block diagram illustrating a system of arranging the delivery of advertisements over a network in accordance with a preferred embodiment of the present invention.
Figure 2:
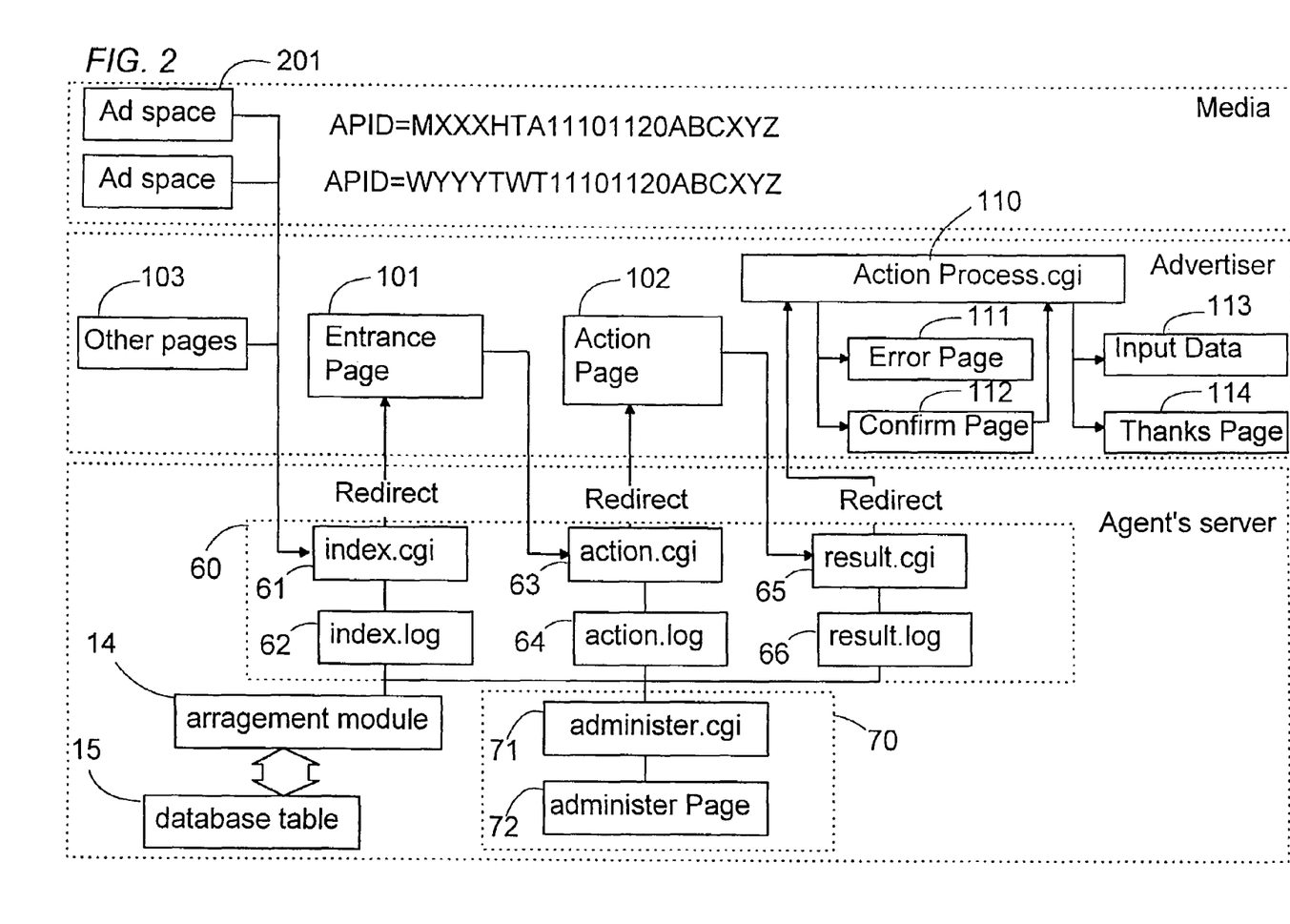
FIG. 2 is another block diagram illustrating the above system.

FIGS. 1 and 2 illustrate a system of arranging the delivery of advertisements over a network in accordance with a preferred embodiment of the present invention. The system is managed by an agent having an agent's server 10 for arranging the delivery of the advertisements intended by advertisers over the network such as the Internet to media owners, i.e., potential affiliates having their own network medium such as a mailing magazine, an opt-in mailing service, a web-site or any other network media affording ad spaces 201, i.e., spaces for sale for advertisement such as an add expression and an ad banner. The advertiser is defined to have its own web site where the network users can access for obtaining information about services and products of the advertiser. The server 10 communicates over the network with the advertisers as well as with the affiliates so that the affiliate can determine whether or not to place the intended advertisement on its network media.

The advertisers and the affiliates are limited to those who have already registered with the system and are given therefrom individual IDs and passwords for access to the system. At the registration, the advertisers and the affiliates are requested to provide their corporate details to a registration page 11 on a web site provided by the server 10. Based upon the details thus provided, the agent' server 10 prepares groups of the registered advertisers and affiliates with whom the server 10 communicates over the network.

In order to make a matching of the advertisers' proposals with the affiliates' interest, the agent's server 10 collects requests for different advertisements and offers the advertisers' requests to the affiliates. For this purpose, the agent's server 10 includes an invitation module 12 which provides on its web site an invitation page 20 for access by the advertisers and an offer page 40 for access by the affiliates. The invitation page 20 collects conditions for placement of an intended advertisement with respect to a particular campaign by the advertiser and other information requested by the advertiser for the campaign.

The conditions include a selection of one or more from defined responses expected by the network users as a consequence of the advertisement and a cost per response payable to the affiliate. The defined responses are 1) visiting or clicking through the advertiser's web site
2) downloading a file or software from the advertiser's web site;
3) applying for a prize offered by the advertiser on the advertiser's web site;
4) answering a questionnaire from the advertiser;
5) requesting a catalog from the advertiser through the advertiser's web site;
6) requesting subscription to a newsletter from the advertiser's web site;
7) signing up for a membership of a club managed on the advertiser's web site;
8) ordering a product or service at the advertiser's web site; and
9) any other positive action that requires a reaction from the advertiser.

The Information Includes, for Example,
i) campaign objective;
ii) maximum counts of response per a predetermined period of time;
iii) category of target network users;
iv) desired media;
v) requested advertising period
vi) advertising content
vii) URL of the advertiser's web site.

Figure 3:
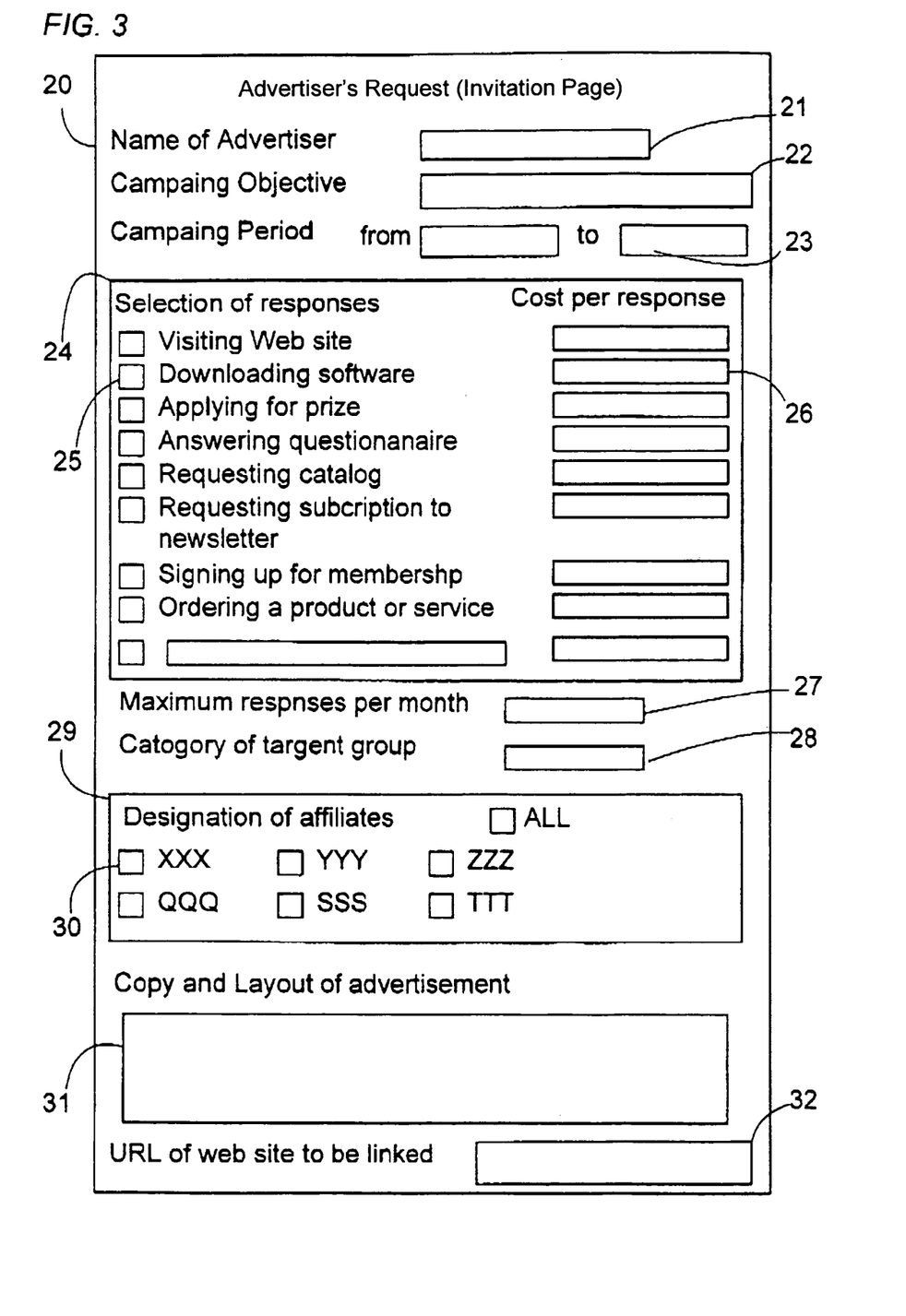
FIG. 3 is a view of an invitation page utilized in the above system.

The above conditions and information are entered by the advertisers on the invitation page 20, one exemplary format of which is shown in FIG. 3. The page includes a name entry 21 for the name of the advertiser, a campaign entry 22 for a campaign objective, a campaign period entry 23 for starting and ending date of the campaign, a selection box 24 for selection of defined responses, an entry 27 for the number of maximum responses per month to be paid for, an entry 28 for category of target group, a designation box 29 for designation of desired affiliate, a layout entry 31 for text and image of the advertisement, and a URL entry 32 for URL of the advertiser's web site to be linked to the advertisement. The selection box 24 lists the defined responses each associated with check-box 25 and a cost per response entry 26 so that the advertiser can select one or more of the responses by simply marking the corresponding checkbox and inputting a bid at the cost per response. At the designation box 29, the advertiser is prompted to select the individual medium or all of the listed media by simply checking the corresponding checkboxes 30.

Upon completion of the invitation page 20 by the advertiser, the agent's server 10 responds to create a campaign code of six upper-case letters. First three letters of the campaign code are chosen to identify the advertiser's name, and the last three letters are chosen to identify a particular product or service of the advertisers. For instance, campaign code of "ABCXYZ" indicates the advertisement by the advertiser having a corporate code of "ABC" for the particular product or service assigned to a brand code "XYZ". Thus, different campaigns by the same advertiser can be well discriminated from each other in the system. The corporate code of the advertiser is assigned to the advertiser at the time of subscription to the system, while the brand code is assigned each time of completing the invitation page 20.

Figure 4:
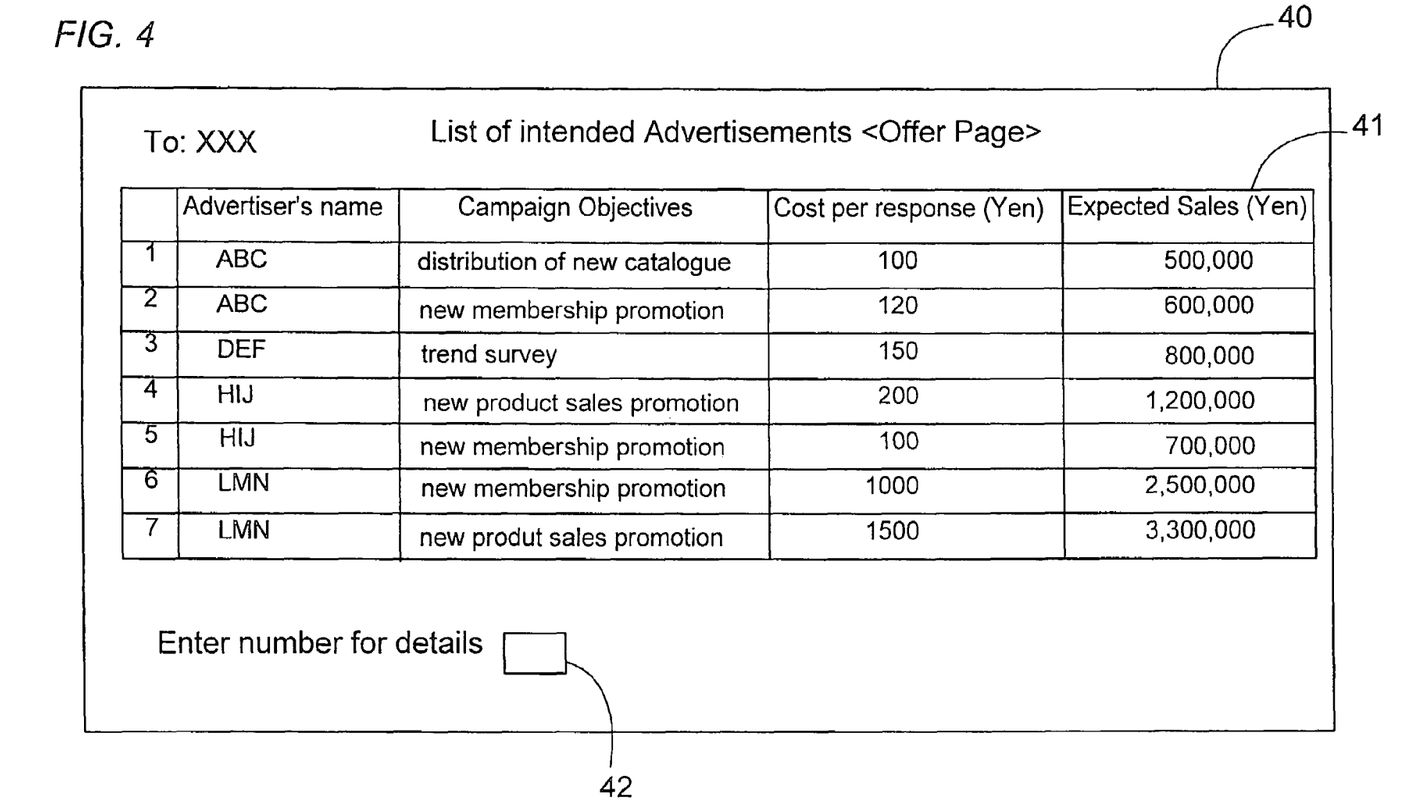
FIG. 4 is a view of an offer page utilized in the above system.
Figure 5:
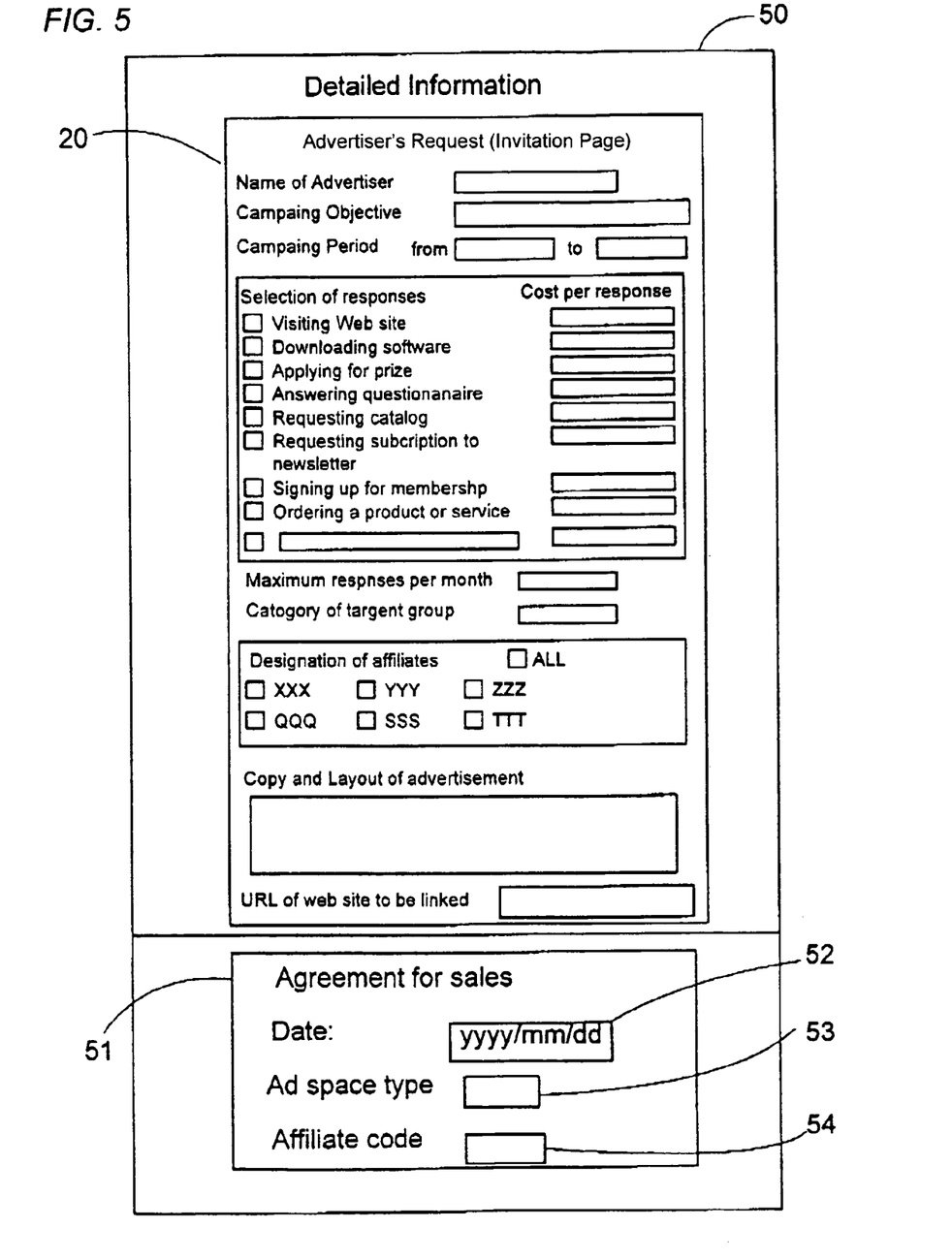
FIG. 5 is a view of a part of the offer page.

The conditions and information provided by the advertisers are received at an offer module 13 in the server 10 to make up the offer pages 40 listing the intended advertisements for the advertiser. The offer pages 40 are prepared for the different affiliates designated. The individual offer pages 40 are placed on the agent's web site so that the designated affiliates can access only to the corresponding offer pages 40 prepared for that affiliates. One example of the offer page 40 is shown in FIG. 4 which includes a list 41 of the intended advertisements designating the affiliate allowed to access this page. The list includes the advertiser's name, campaign objects, cost per response, and an expected sales which is obtained from analysis of previous statistical data accumulated in the agent's server 10. When no relevant statistical data is available, the expected sales is left blank. The offer page 40 includes an entry 42 for further review of the details of the intended advertisement and a detailed information page 50. By putting a corresponding listing number into the entry 42, a display is jumped to the detailed information page 50 which, as shown in FIG. 5, reproduces the invitation page 30 and includes an agreement section 51 with entries 52, 53, and 54 for prompting entries of date (yyyy/mm/dd), type of the ad space 201 prepared for the advertisement, and an affiliate code assigned to the affiliate at the time of subscription to the system. The type of the ad space is designated by an ad space code of 3 upper-case letters chosen from a table included in a manual delivered to the affiliate at the time of subscription to the system. The table shown below is one example for the ad space code.

| Ad space code | Designation |
|---|---|
| HTA | Header text Advertisement (Mail magazine) |
| TWT | Top page of Web site in Text format |
| CWB | at Category of Web site in Banner format |

The offer page 40 and the information page 50 provide sufficient information so that the affiliate can decide, in consideration of the information together with the user's demographics of the affiliate's medium, which ad space 201 to place the advertisement. When the affiliate accepts the conditions proposed by the advertiser through the offer page 40, the affiliate is only required to complete the agreement section 51. The reply from the offer page 40 is then sent back to arrangement module 14 of the agent's server 10, which responds to establish an advertisement contract between the affiliate and the advertiser, and delivers a confirmation notice of the contract to the advertiser and the affiliate by way of e-mail. The confirmation notice includes an actual period between starting and ending the placement of the advertisement on the ad space 201 and a media indicator. The media indicator indicates the type of network media, such as the mailing magazine, the opt-in mailing service, the web-site and the like affording the ad spaces. For example, the mailing magazine is designated by a letter of 'M', the opt-in mailing service is by a letter of 'O', and the web-site is by a letter of 'W'. These letters are assigned to the corresponding media and acknowledged by the agent's server when the affiliates makes registration to the system.

The arrangement module 14 creates an ad placement identification code (APID), upon completion of the agreement section 51 by the affiliate, for identification of the particular advertisement campaign and the affiliate placing the advertisement. The APID includes a media code plus a period code and the campaign code. The media code is composed of the single letter indicative of the type of the media, plus the affiliate code and the ad space code, while the period code is defined by 8-digits numerals for indication of starting and ending the advertisement. That is, the APID of "MXXXHTA11101120ABCXYZ" indicates that the media type is the mail magazine by the first letter of 'M';

the media name is represented by the media code of "XXX" of the subsequent 3 letters;

the ad space type is represented by the ad space code "HTA" of the subsequent 3 letters;

the starting date of advertisement is November 10 by the subsequent 4 digits "1110";

the ending date of advertisement is November 20 by the subsequent 4 digits "1120";

the advertiser's name is represented by the corporate code of "ABC" of the subsequent 3 letters; and the brand or service is represented by the brand code of "XYZ" of the last 3 letters.

Likewise, APID of "WYYYTWT11101120ABCXYZ" indicates the same advertisement campaign for the same period but at the different ad space of the different affiliate, i.e., at the ad space represented by "TWT" sold by the affiliate whose name is represented by the affiliate code "YYY".

The APID thus created is stored in a database table 15 in the server 10 for administration of the advertisement campaign by the agent. In an exact sense, the advertisement contract is deemed to be established at this time of storing the APID in the database.

Then, the arrangement module 14 allocates the ad space 201 to defined pages of the advertiser's web site through the agent's server 10. The defined pages are an entrance page 101 which is initially visited by the user from the ad space 201 and an action page 102 which induces the user's response selected by the advertiser to be paid for.

The following description illustrates a case where the advertisers exclude the user's response of mere visiting the entrance page from the response to be paid for. That is, the defined responses to be paid for are limited to:

1) downloading a file or software from the advertiser's web site;
2) applying for a prize offered by the advertiser on the advertiser's web site;
3) answering a questionnaire from the advertiser;
4) requesting a catalog from the advertiser through the advertiser's web site;
5) requesting subscription to a newsletter from the advertiser's web site;
6) signing up for a membership of a club managed on the advertiser's web site;
7) ordering a product or service at the advertiser's web site; and
8) any other positive action that requires a reaction from the advertiser.

In this sense, the action page 102 includes an action prompt proposing the defined responses selected from the above. Accordingly, in the following description, the term "action" refers to the response selected by the advertiser to be paid for in order to exclude a simple user's response of visiting the entrance page from the user's positive actions which necessitates the advertiser to answer the action and for which the cost is paid. The advertiser's web site further includes an action process CGI (common gateway interface) 110 which is a module programmed to answer the particular action made at the action page 102. The action process CGI 110 is operatively coupled to an error page 111 checking an error in answering the action, a confirm page 112 verifying the action for processing the action, an input data 113 storing the user's information carried by the action, and a thanks page 114 for sending back acknowledgements to the user.

The arrangement module 14 generates an index URL which guides the user clicking on the ad space 201 to the entrance page 101 of the advertiser's web site through the agent's server 10 for monitoring the user's access induced by the advertisement. The index URL includes a statement identifying the advertiser's name, the agent, and the APID. The index URL is embedded in the ad space 201 so that an index CGI 61 of the agent's server 10 catches the information of the user clicking on the ad space 201, in addition to the advertiser's name and the APID. One example of the index URL is as follows:

http://www.actionclic.net/cgi-bin/clientname/index.cgi?MXXXHTA11101120ABCXYZ where "www.actionclic.net/cgi-bin" designates the agent's server;

"clientname" designates the advertiser's name;

"index.cgi" designates the index CGI;

? is a parameter indicator; and

"MXXXHTA11101120ABCXYZ" is a parameter designating the APID.

Based upon the advertiser's name and the APID received at index CGI 61, the arrangement module 14 identifies an entrance page URL of the entrance page 101 with reference to the database table 15. Thus, index CGI 61 is enabled to redirect the user's response to the entrance page 101 of the advertiser's web site immediately after receiving the information. Some of the information received at index CGI 61 is stored in an index log file 62 for analysis of the user's behavior as will be discussed hereinafter. Such information includes:

date and time of the user requesting for access to the entrance page;

a referrer log showing all referring pages from which the user is led to entrance page;

APID; and optionally user's IP address.

Also upon establishment of the advertisement contract, the arrangement module 14 prepares an action URL and a result URL for linking the entrance page 101 and the action page 102 respectively to an action CGI 63 and result CGI 64 of the agent's server 10. Action URL is embedded in a guide object appearing in the entrance page 101 for inviting the user to the action page 102 and directing the user's response through action CGI 63 to the action page 102.

One example of action URL is as follows:

http://www.actionclic.net/cgi-bin/clientname/action.cgi where

"www.actionclic.net/cgi-bin" designates the agent's server;

"clientname" designates the advertiser's name; and

"action.cgi" designates the action CGI.

Action CGI 63 catches the information resulting from the user's clicking or the like response to the guide object of the entrance page 101 and stores the information in an action log file 64. The information includes:
  date and time of the user requesting for access to the action page;
  a referrer log showing all referring pages from which the user is led to the action page; and optionally
  user's IP address.

The data of referring pages are then collated with those obtained at index CGI 61 to identify the origin of the response, i.e., APID since the referring pages carry the index URL of the ad space 201 which is the key for identification of the origin of the response. From this identification, action CGI 63 retrieves an action page URL of the action page 102 and redirects the user's response to the action page 102. Data of the information received at action CGI 63 are stored in an action log file 64 with the APID identified.

The result URL is embedded in an action object which is inserted in the action page 102 for access by the user to require one of the defined responses or actions that the advertiser selected to pay for. Further, with action process URL, the user's action made to the action object is directed to the action process CGI 110 through a result CGI 65 of the agent's server 10 for collecting data of the user's action made to the defined response. One example of result URL is as follows:

http://www.actionclic.net/cgi-bin/clientname/result.cgi where

"www.actionclic.netcgi-bin" designates the agent's server;

"clientname." designates the advertiser's name; and

"result.cgi" designates the result CGI.

Result CGI 65 catches the information resulting from the user's clicking or the like response to the action object of the action page 102 and stores the information in an result log file 66. The information includes:
  date and time of the user making the defined action on the action page;
  a referrer log showing all referring pages from which the user is led to action process CGI; and optionally
  user's IP address.

The data of referring pages are then collated with those obtained at index CGI 61 to identify the origin of the response, i.e., APID as discussed in the above. From this identification, result CGI 65 retrieves an action process URL of the action process CGI 110 and redirects the user's response thereto. Data of the information received at result CGI 65 are stored in a result log file 66 with the APID identified. The action process CGI 110 responds to give the required answer directly to the user and not through the agent's server.

Since the advertiser's web site may have other pages 103 not linked to the agent's server 10, it is possible that the user jumps to the entrance page 101 or action page 102 from the other pages and not from the ad space 201. In this condition, index CGI cannot fetch APID and therefore no APID code is stored in either of the log files 62, 64, and 66. Thus, the absence of APID can makes it possible to discriminate such actions from those originated from the ad space 201 which is to be paid for.

The index CGI 61, action CGI 63, result CGI 65 and the associated log files are cooperative to form a response measurement module 60 for providing data of the user's responses or actions induced by the advertisement on the ad space 201. The database table 15 stores the individual APID, the advertiser's name, the advertisers code, the URLs of the entrance page 101, action page 102, action process CGI 120 of the advertiser's web site, the affiliate's code, the affiliate's name, passwords and IDs for the advertisers and the affiliates, cost per response determined by the advertiser, and the other fields for providing corresponding data or relation between these fields in answer to inquires from the arrangement module 14 or the other modules of the agent's server.

It is noted in this connection that the response measurement module may include one or more additional result CGIs may be included together with complementary result log files and result URLs when the advertisers selects more than one defined responses to be paid for. The additional result CGI is linked to the action page 102 by way of corresponding result URL so as to count the additional user's response or action made at the action page 102 for storing the additional action process data to the corresponding result log file.

Further included in the server 10 is an administration module 70 having an administer CGI 71 and provides an administer page 72 on the agent's web site. The administer CGI 71 is coupled to the index log file 62, action log file 64, and result log file 66 to collect the data therefrom and prepare statistical data with regard to the responses or actions counted at the response measurement module 60. The statistical data are disclosed in the administer page 72 in various report forms selectively to the advertisers and the affiliates allowed to access. The statistical data include:

1) a page access number which is the number of the accesses to the entrance page of the advertiser's web site during a predetermined period of time;
2) an action access number which is the number of accesses to the action page during the above period of time,
3) a result number which is the number of the actions made in response to the action object for necessitating the processing at the action process CGI during the above period of time;
4) a proceeder rate which is the ratio of the action access number to the page access number;
5) a completer rate which is the ratio of the result number to page access number, and
6) a cost table showing a cost payable for the affiliate or for the agent with regard to the actions counted during a predetermined period of time.

The cost is calculated from the counted action and the cost per response determined by the advertiser and stored in the database table 15 as related to the selected action.

The report forms are classified into a first report format directed to the advertisers and a second report format directed to the affiliates. The first report format includes:

a) a listing of counted responses on a dairy basis;
b) a listing of APID (ad spaces) in order of counted responses; and
c) a listing of any one of the referring pages in order of counted responses for all or any combination of the above statistical data.

The Second Report Format Includes:

a) a listing of the advertisers in order of counted responses for all or any combination of the above listed statistical data; and b) a listing of APID (ad spaces) in order of counted responses for all or any combination of the above statistical data.

Selection of the formats is made at the administer page. Also, the administer page 72 includes a button which enables the advertiser and the affiliate to download data of the log files 62, 64, and 66 limited to those concerned.

Based upon the statistical report prepared for the individual advertisers and the affiliates, the advertiser can evaluate the effectiveness of the advertisement and the affiliate can charge the advertiser.

Figure 6:
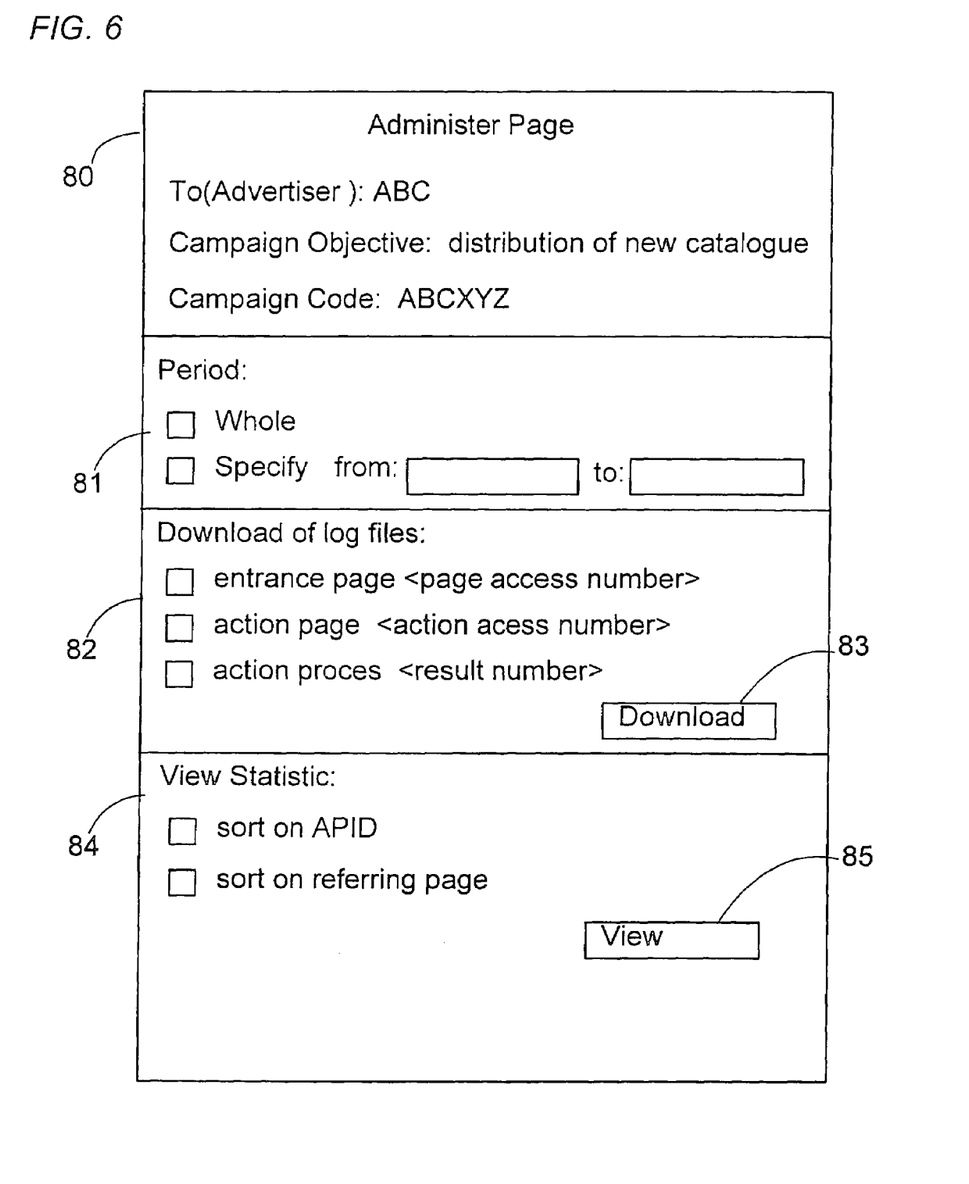
FIG. 6 is a view of an administer page for an advertiser utilized in the above system.
Figure 7:
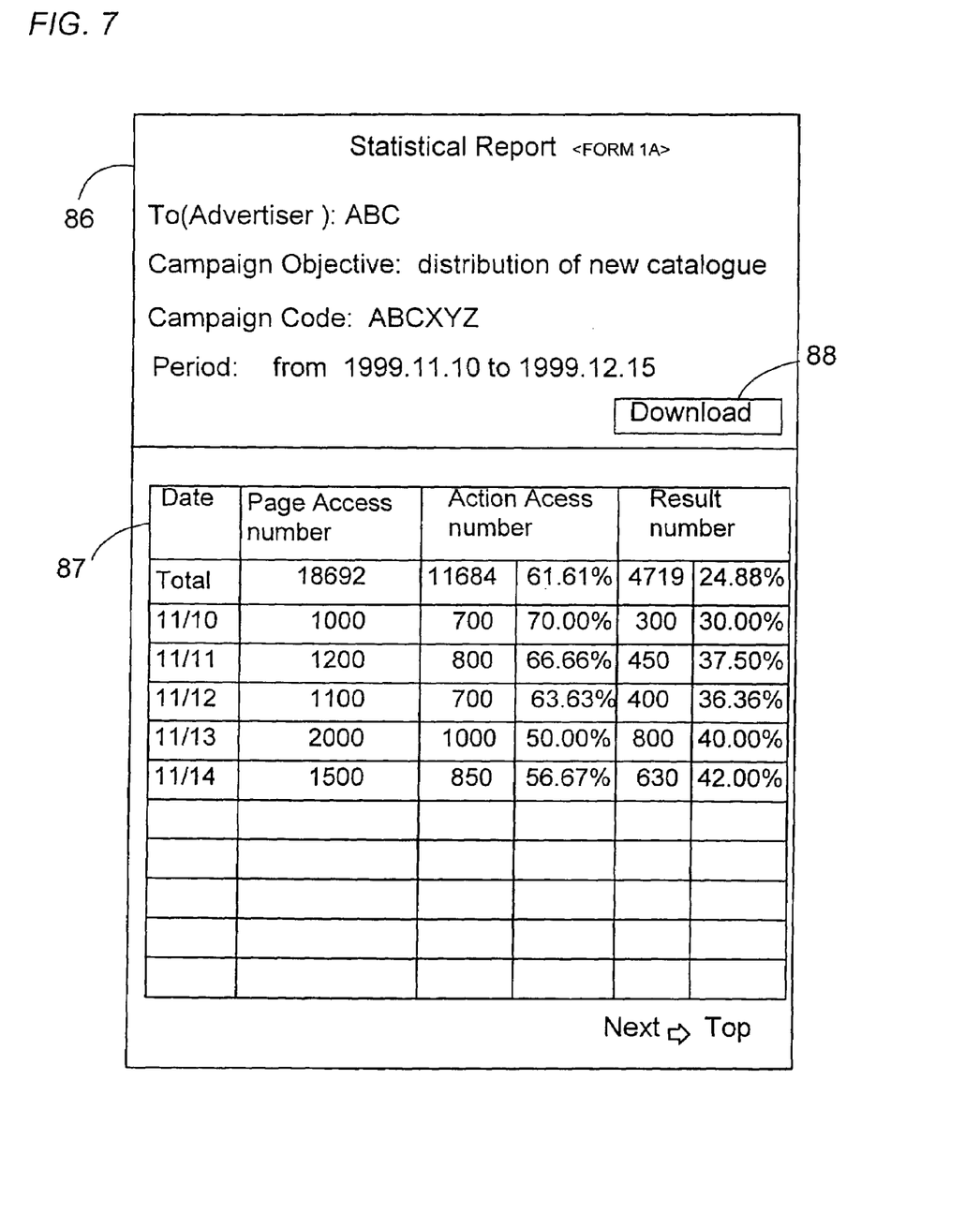
FIG. 7 is a view of a statistical report issued to the advertiser.

FIG. 6 shows one example of the report form 80 displayed on the administer page 72 for limited access by the advertiser. The report form includes a period entry 81 for selecting the whole available period or a certain period of the accumulated data in the agent's server 10. Download section 82 is provided to download data of any one of selected log files 62, 64, and 66. Clicking a download button 83 starts up downloading of the log file data to the advertiser. Further, a view-report section 84 is provided to display the statistical data sorted on the selected items, i.e., APID and referring pages. Clicking on a view button 85 causes a display jump to a statistical report page 86 as shown in FIG. 7. The report page 86 includes a table 87 showing the statistical data on a dairy basis with a row of the total of page access number, action access number, result number, proceeder rate, and completer rate. The report page 86 also includes a download button 88 which enables the advertiser to download the displayed data.

Figure 8:
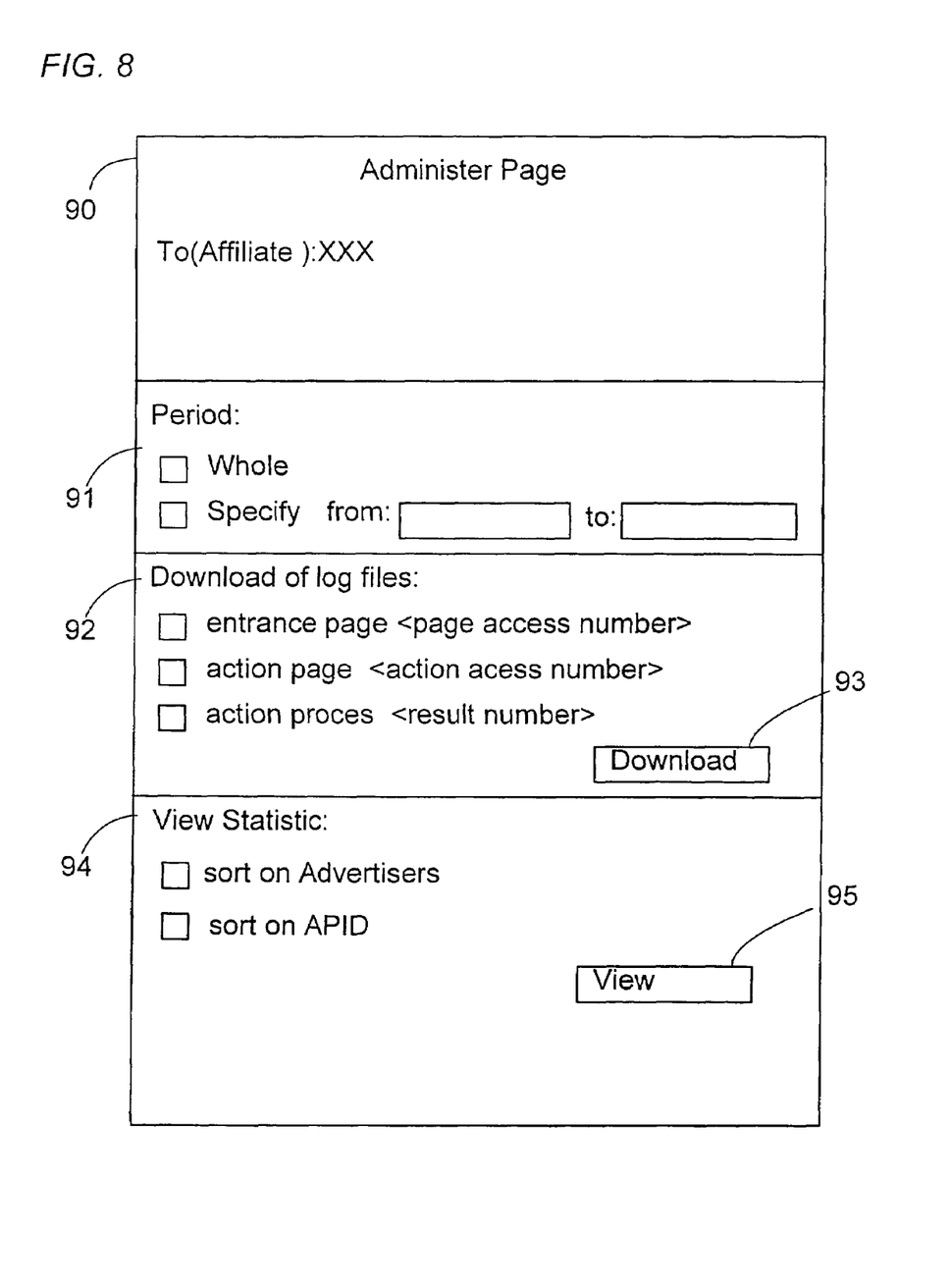
FIG. 8 is a view of an administer page for an affiliate utilized in the above system.
Figure 9:
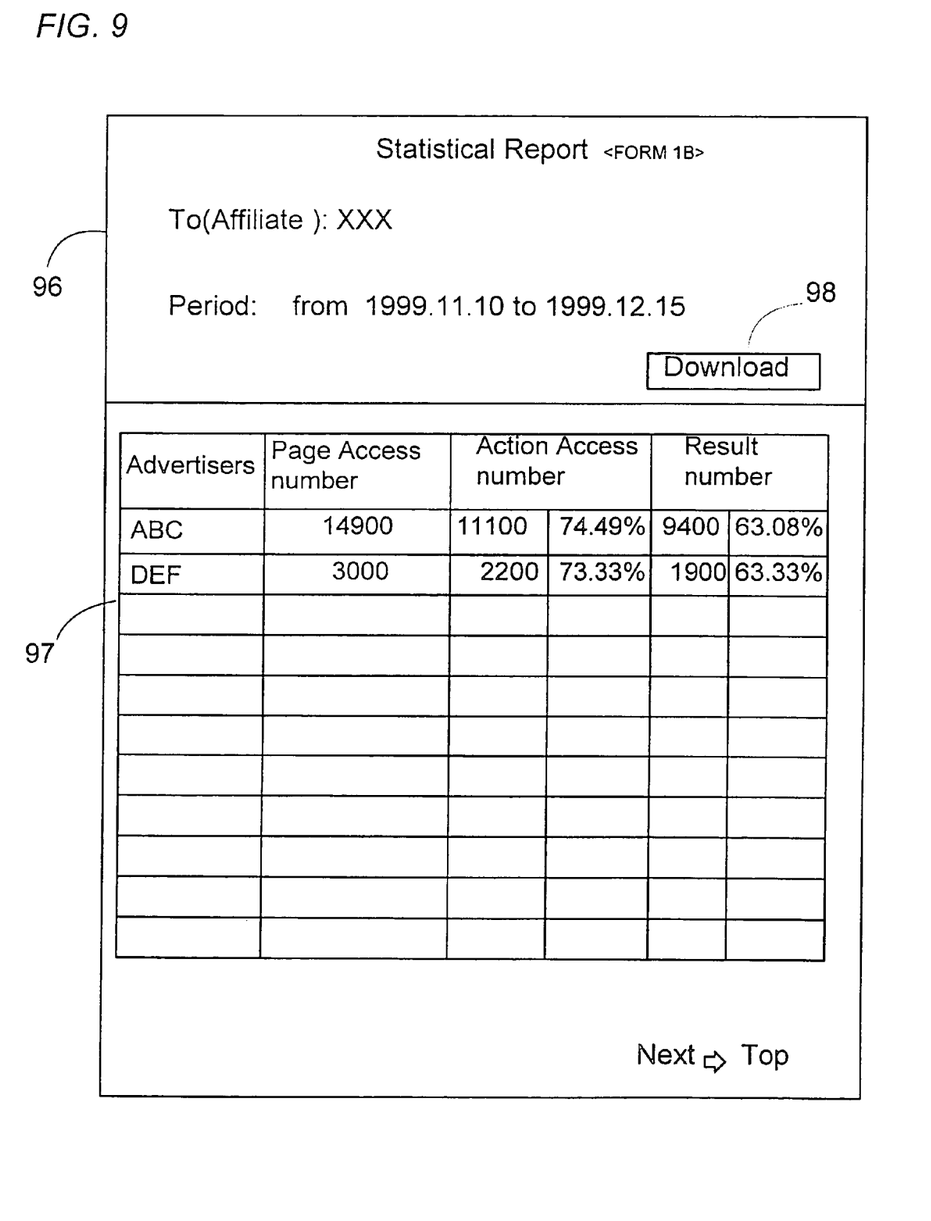
FIG. 9 is a view of a statistical report issued to the affiliate.

FIG. 8 shows one example of the report form 90 displayed on the administer page 72 for limited access by the affiliate. The report form 90 includes a period entry 91 for selecting whole available period or a certain period of the accumulated data in the agent's server 10. Download section 92 is provided to download data of any one of selected log files 62, 64, and 66. Clicking on a download button 93 starts up downloading of the log file data to the affiliate. Further, a view-report section 94 is provided to display the statistical data sorted on the selected items, i.e., the advertiser's name and APID. Clicking on a view button 95 causes a display to jump to a statistical report page 96 as shown in FIG. 9. The report page 96 includes a table 97 showing the statistical data including page access number, action access number, result number, proceeder rate, and completer rate with regard to the different advertisers. The report page 96 also includes a download button 98 which enables the advertiser to download the displayed data.

It is noted in this connection that the above statistical data may be presented to the advertiser in another report form which lists a ranking of the affiliates in order of counted responses.

LIST OF REFERENCE NUMERALS

| | |
|---|---|
| 10 | agent's server |
| 11 | invitation module |
| 12 | offer module |
| 14 | arrangement module |
| 15 | database table |
| 20 | invitation page |
| 21 | name entry |
| 22 | campaign entry |
| 23 | campaign period entry |
| 24 | selection box |
| 25 | checkbox |
| 26 | cost per response entry |
| 27 | entry |

-continued

LIST OF REFERENCE NUMERALS

| | |
|---|---|
| 28 | entry |
| 29 | designation box |
| 30 | checkbox |
| 31 | copy entry |
| 32 | URL entry |
| 40 | offer page |
| 41 | list of advertisements |
| 42 | entry |
| 50 | information page |
| 51 | agreement section |
| 52 | date entry |
| 53 | ad space type entry |
| 54 | affiliate code entry |
| 60 | response measurement module |
| 61 | index CGI |
| 62 | index log file |
| 63 | action CGI |
| 64 | action log file |
| 65 | result CGI |
| 66 | result log file |
| 70 | administration module |
| 71 | administer CGI |
| 72 | administer page |
| 80 | report form |
| 81 | period entry |
| 82 | download section |
| 83 | download button |
| 84 | view-report section |
| 85 | view button |
| 86 | report page |
| 87 | table |
| 88 | download button |
| 90 | report form |
| 91 | period entry |
| 92 | download section |
| 93 | download button |
| 94 | view-report section |
| 95 | view button |
| 96 | statistical report page |
| 97 | table |
| 98 | download button |
| 101 | entrance page |
| 102 | action page |
| 110 | action process CGI |
| 111 | error page |
| 112 | confirm page |
| 113 | input data |
| 114 | thanks page |
| 201 | ad space |

What is claimed is:

1. A system of arranging the delivery of advertisements over a network, an agent managing said system, said system comprising an agent's server having:

a response measurement module, said response measurement module counting the number of specific responses made at a web site of an advertiser through an ad space of a network medium; and an administration module, said administration module making a statistical report for analysis of the counted responses and delivering said statistical report through said agent's server to the advertiser so that the advertiser can estimate the effectiveness of an advertisement on said network, wherein said web site includes an entrance page which is linked from said ad space, an action page which is linked from the entrance page and where a user of said network may proceed to make at least one specific action of defined responses to be made by the user as a consequence of the advertisement on said network, and an action process module which responds to said specific action for processing the same, wherein said administration module produces said statistical report listing a page access number that is the number of the accesses to the entrance page of said web site during a predetermined period of time, an action access number that is the number of accesses to said action page, and a result number that is the number of actions made in response to an action object for necessitating processing at said action process module, and wherein said statistical report includes a proceeder rate, which is the ratio of the action access number to said page access number, and a completer rate, which is the ratio of the result number to said page access number.

2. The system as set forth in claim 1, wherein said defined responses include:
- clicking through to said web site;
- downloading a file or software from said web site;
- applying for a prize offered by the advertiser on said web site;
- answering to a questionnaire from the advertiser on said web site;
- requesting a catalogue from the advertiser through said web site;
- requesting a subscription to a newsletter from said web site;
- signing up a membership of a club managed by the advertisers through said web site; and
- ordering a product or service through said web site.

3. The system as set forth in claim 1, wherein said statistical report including a table showing a ratio of the number of the responses counted to the number of visits to said web site.

4. The system as set forth in claim 1, wherein said proceeder rate and said completer rate being listed on a daily basis.

5. The system as set forth in claim 1, wherein said proceeder rate and said completer rate being listed per said ad code when different ad codes are assigned to different campaigns.

6. The system as set forth in claim 1, wherein said page access number, said action access number, and said result number are sorted on each ad code when more than one ad codes are assigned to different campaigns.

7. The system as set forth in claim 1, wherein said statistical report includes a referrer table listing a ranking of referred URLs which lead to the action process module through said entrance page and said action page.

8. The system as set forth in claim 1, further comprising an invitation module providing an invitation page, into which said advertiser can provide at least one entry to specify conditions of the advertisement.

9. The system as set forth in claim 8, further comprising an offer module making an ad schedule listing the advertisement with the specified conditions.

10. The system as set forth in claim 1, further comprising an arrangement module allocating said web site to said ad space of said network by placing the advertisement thereon.

11. The system as set forth in claim 1, wherein said administration module makes said statistical report with reference to an index log file for storing index data with regard to the user requesting access to said entrance page, an action log file for storing action access data with regard to the user requesting access to said action page, and a result log file for storing action process data with regard to the user requesting the processing at said action process module.

12. A system of arranging the delivery of advertisements over a network, an agent managing said system, said system comprising an agent's server having:
- a response measurement module, said response measurement module counting the number of specific responses made at a web site of an advertiser through an ad space of a network medium; and
- an administration module, said administration module making a statistical report for analysis of the counted responses and delivering said statistical report through said agent's server to the advertiser so that the advertiser can estimate the effectiveness of an advertisement on said network, wherein said web site includes an entrance page which is linked from said ad space, an action page which is linked from the entrance page and where a user of said network may proceed to make at least one specific action of defined responses to be made by the user as a consequence of the advertisement on said network, and an action process module which responds to said specific action for processing the same, wherein said administration module produces said statistical report listing a page access number that is the number of the accesses to the entrance page of said web site during a predetermined period of time, an action access number that is the number of accesses to said action page, and a result number that is the number of the access to said action process module, wherein said statistical report includes a proceeder rate, which is the ratio of the action access number to said page access number, and a completer rate, which is the ratio of the result number to said page access number.

13. A method of arranging the delivery of advertisements over a network by an agent's server, said method comprising the steps of:
- counting the number of specific responses made at a web site of an advertiser through an ad space of a network medium; and
- making a statistical report for analysis of the counted responses and delivering said statistical report through said agent's server to the advertiser so that the advertiser can estimate the effectiveness of an advertisement on said network, wherein said web site includes an entrance page that is linked from said ad space, an action page that is linked from the entrance page and where a user of said network may proceed to make at least one specific action of defined responses to be made by the user as a consequence of the advertisement on said network, and an action process module which responds to said specific action for processing the same, wherein said administration module produces a statistical report listing a page access number that is the number of the accesses to the entrance page of said web site during a predetermined period of time, an action access number that is the number of accesses to said action page, and a result number that is the number of actions made in response to an action object for necessitating processing at said action process module;

wherein said statistical report includes a proceeder rate, which is the ratio of the action access number to said page access number, and a completer rate, which is the ratio of the result number to said page access number.

14. The system as set forth in claim 1, wherein said administration module provides an administer page on an agent's web site, and a report form displayed on said administer page for limited access by the advertiser has a button for display a statistical report page including said proceeder rate and said completer rate.

15. The system as set forth in claim 14, wherein said statistical report page has a download button which enables the advertiser to download said proceeder rate and said completer rate displayed thereon.

* * * * *